United States Patent
Zhang et al.

(10) Patent No.: US 10,556,832 B2
(45) Date of Patent: Feb. 11, 2020

(54) CUTTERS COMPRISING POLYCRYSTALLINE DIAMOND ATTACHED TO A HARD METAL CARBIDE SUBSTRATE

(71) Applicant: DIAMOND INNOVATIONS, INC., Worthington, OH (US)

(72) Inventors: Hui Zhang, Westerville, OH (US); Abhijit Suryavanshi, Issaquah, WA (US); Alexander Hirsch, Warwickshire (GB); Kai Zhang, Westerville, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 33 days.

(21) Appl. No.: 15/514,429

(22) PCT Filed: Sep. 25, 2015

(86) PCT No.: PCT/US2015/052215
§ 371 (c)(1),
(2) Date: Mar. 24, 2017

(87) PCT Pub. No.: WO2016/049452
PCT Pub. Date: Mar. 31, 2016

(65) Prior Publication Data
US 2017/0297960 A1    Oct. 19, 2017

Related U.S. Application Data

(60) Provisional application No. 62/055,679, filed on Sep. 26, 2014.

(51) Int. Cl.
*C04B 37/00* (2006.01)
*B22F 3/14* (2006.01)
(Continued)

(52) U.S. Cl.
CPC .............. *C04B 37/001* (2013.01); *B22F 3/14* (2013.01); *B22F 7/06* (2013.01); *B24D 18/0009* (2013.01);
(Continued)

(58) Field of Classification Search
None
See application file for complete search history.

(56) References Cited

U.S. PATENT DOCUMENTS

| 3,141,746 A | 7/1964 | De Lai |
| 3,609,818 A | 10/1971 | Wentorf |

(Continued)

FOREIGN PATENT DOCUMENTS

| GB | 2489583 A | * 10/2012 | ............... B22F 3/24 |
| WO | 2010029518 A1 | 3/2010 | |

(Continued)

OTHER PUBLICATIONS

Metals Handbook, 8th Ed, vol. 2, American Society for Metals, 1964, pp. 93-114.
(Continued)

*Primary Examiner* — Colleen P Dunn
*Assistant Examiner* — Ross J Christie (57) ABSTRACT

Superabrasive compacts and methods of making superabrasive compacts are disclosed. A superabrasive compact includes a polycrystalline diamond table and a substrate attached to the polycrystalline diamond table. The substrate includes a hard metal carbide and a binder having a compound with a composition of $A_xB_yC_z$, where A and B are transition metals, where C is carbon, and where $0 \le x \le 7$, $0 \le y \le 7$, $x+y=7$, and $0 \le z \le 3$.

16 Claims, 3 Drawing Sheets

(51) Int. Cl.
*B22F 7/06* (2006.01)
*C22C 26/00* (2006.01)
*C22C 29/08* (2006.01)
*B24D 18/00* (2006.01)
*C04B 35/528* (2006.01)
*C04B 35/56* (2006.01)
*C04B 35/645* (2006.01)
*E21B 10/573* (2006.01)

(52) U.S. Cl.
CPC ........ *C04B 35/528* (2013.01); *C04B 35/5626* (2013.01); *C04B 35/645* (2013.01); *C22C 26/00* (2013.01); *C22C 29/08* (2013.01); *E21B 10/5735* (2013.01); *B22F 2302/10* (2013.01); *C04B 2235/3847* (2013.01); *C04B 2235/404* (2013.01); *C04B 2235/405* (2013.01); *C04B 2235/427* (2013.01); *C04B 2237/36* (2013.01); *C04B 2237/363* (2013.01)

(56) References Cited

U.S. PATENT DOCUMENTS

| | | | |
|---|---|---|---|
| 3,745,623 A | 7/1973 | Wentorf et al. | |
| 3,850,591 A | 11/1974 | Wentorf | |
| 4,394,170 A | 7/1983 | Sawaoka et al. | |
| 4,403,015 A | 9/1983 | Nakai et al. | |
| 4,694,918 A | 9/1987 | Hall | |
| 4,794,326 A | 12/1988 | Friedl | |
| 4,954,139 A | 9/1990 | Cerutti | |
| 5,310,605 A | 5/1994 | Baldoni, II et al. | |
| 5,649,279 A | 7/1997 | Gustafson et al. | |
| 5,955,186 A | 9/1999 | Grab | |
| 6,217,992 B1 | 4/2001 | Grab | |
| 7,569,179 B2 | 8/2009 | Fang | |
| 7,699,904 B2 | 4/2010 | Fang | |
| 8,080,071 B1 | 12/2011 | Vail | |
| 2010/0126779 A1* | 5/2010 | Corbett | B22F 7/06 175/432 |
| 2010/0275523 A1* | 11/2010 | Tank | C04B 35/52 51/307 |
| 2011/0067929 A1 | 3/2011 | Mukhopadhyay et al. | |
| 2012/0055716 A1 | 3/2012 | Martensson et al. | |
| 2013/0092452 A1* | 4/2013 | Mukhopadhyay | B22F 7/062 175/428 |
| 2013/0133957 A1 | 5/2013 | Belnap et al. | |

FOREIGN PATENT DOCUMENTS

| | | | | |
|---|---|---|---|---|
| WO | 2013087773 A1 | 6/2013 | | |
| WO | WO-2013087773 A1 * | 6/2013 | ............. | C22C 26/00 |
| WO | WO-2013178550 A1 * | 12/2013 | ................ | B22F 7/08 |

OTHER PUBLICATIONS

Gupta, K.P.: "The Co—Cr—W (cobalt-Chromium-Tungsten) System". Journal of Phase Equilibria and Diffusion, vol. 24, No. 2, Apr. 1, 2006 pp. 178-183.

* cited by examiner

CUTTERS COMPRISING POLYCRYSTALLINE DIAMOND ATTACHED TO A HARD METAL CARBIDE SUBSTRATE

RELATED APPLICATION DATA

This application is a § 371 National Stage Application of PCT International Application No. PCT/US2015/052215 filed Sep. 25, 2015 claiming priority of U.S. Provisional Application No. 62/055,679, filed Sep. 26, 2014.

TECHNICAL FIELD AND INDUSTRIAL APPLICABILITY

The present invention relates generally to a compact and a superabrasive compact and a method of making superabrasive materials, and more particularly, to substrates for polycrystalline diamond compacts (PDC) with unique properties and polycrystalline diamond compacts with such substrates.

SUMMARY

In one embodiment, a superabrasive compact includes a polycrystalline diamond table and a substrate attached to the polycrystalline diamond table. The substrate includes a hard metal carbide and a binder having a compound with a composition of $A_xB_yC_z$, where A and B are transition metals, where C is carbon, and where $0 \leq x \leq 7$, $0 \leq y \leq 7$, $x+y=7$, and $0 \leq z \leq 3$.

In another embodiment, a method of making a superabrasive compact includes positioning a plurality of superabrasive particles proximate to a substrate, where the substrate comprises hard metal carbides, a binder, and a species, and subjecting the substrate and the plurality of superabrasive particles to a high pressure high temperature process suitable for producing the superabrasive compact. The species in the substrate form a compound with a composition of $A_xB_yC_z$, where A and B are transition metals, where C is carbon, and where $0 \leq x \leq 7$, $0 \leq y \leq 7$, $x+y=7$, and $0 \leq z \leq 3$.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Embodiments according to the present disclosure are directed to superabrasive compacts having a polycrystalline diamond table and a substrate attached to the polycrystalline diamond table, where the substrate has a binder having a melting point that is from about 600° C. to about 1350° C. at a pressure from about 30 kbar to about 100 kbar. The melting temperature of the binder in the substrate is lower than the melting temperature of the binder in conventional superabrasive compacts. By incorporating a substrate having a binder with a lower melting temperature than conventional superabrasive compacts, the temperatures used in a high pressure high temperature (HPHT) process to form the superabrasive compact may be lower than those temperatures used with conventional substrates that exhibit higher melting temperatures of the binder. The reduced temperature of the HPHT process may allow for a reduced stress state in the polycrystalline diamond table of superabrasive compacts according to the present disclosure as compared to conventional superabrasive compacts. The reduced stress state in the polycrystalline diamond table may improve the abrasion resistance of the polycrystalline diamond table in a material removal operation. Further, the reduction in the melting temperature of the binder may allow for lower HPHT process temperatures used to attach a substrate to a thermally stable polycrystalline diamond table. Reduction of the temperature in this operation may reduce any damage introduced to the thermally stable polycrystalline diamond table during the substrate attachment step. These and other elements will be discussed in greater detail herein.

Before the description of the embodiment, terminology, methodology, systems, and materials are described; it is to be understood that this disclosure is not limited to the particular terminologies, methodologies, systems, and materials described, as these may vary. It is also to be understood that the terminology used in the description is for the purpose of describing the particular versions of embodiments only, and is not intended to limit the scope of embodiments. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, "about 40%" means in the range of 36%-44%.

As used herein, the term "superabrasive particles" may refer to ultra-hard particles or superabrasive particles having a Knoop hardness of 3500 KHN or greater. The superabrasive particles may include diamond and cubic boron nitride, for example. The term "abrasive", as used herein, refers to any material used to wear away softer materials.

The term "particle" or "particles", as used herein, may refer to a discrete body or bodies. A particle is also considered a crystal or a grain.

The term "superabrasive compact", as used herein, may refer to a sintered product made using super abrasive particles, such as diamond feed or cubic boron nitride particles. The superabrasive compact may include a support, such as a tungsten carbide support, or may not include a support. The "superabrasive compact" is a broad term, which may include cutting element, cutters, or polycrystalline cubic boron nitride inserts.

The term "compact," as used herein, may refer to a sintered superhard product that is attached to a substrate. "Compact" is a broad term, and may include a variety of materials selected for use as the substrate, including any carbide materials such as tungsten carbide or chromium carbide, steel, and composite materials.

The term "binder," as used herein, refers to a material that binds other components in a matrix. "Binder" may refer to the cementing component of the substrate. It may be a catalyst for the growth and sintering of the superhard phase, such as the known VIIIB metals (Group 8 metals) (for example, cobalt, which may be present in cemented tungsten carbide), or it may be a non-catalyst for the growth and sintering of the superhard phase, such as known titanium or chromium, or it may be combinations of catalytic and non-catalytic materials.

The term "cutting element", as used herein, means and includes any element of an earth-boring tool that is used to cut or otherwise disintegrate formation material when the earth-boring tool is used to form or enlarge a bore in the formation.

The term "earth-boring tool", as used herein, means and includes any tool used to remove formation material and form a bore (e.g., a wellbore) through the formation by way of removing the formation material. Earth-boring tools include, for example, rotary drill bits (e.g., fixed-compact or "drag" bits and roller cone or "rock" bits), hybrid bits including both fixed compacts and roller elements, coring bits, percussion bits, bi-center bits, reamers (including expandable reamers and fixed-wing reamers), and other so-called "hole-opening" tools.

The term "feed" or "diamond feed", as used herein, may refer to any type of diamond particles, or diamond powder, used as a starting material in further synthesis of PDC compacts.

The term "polycrystalline diamond", as used herein, may refer to a plurality of randomly oriented or highly oriented monocrystalline diamond particles, which may represent a body or a particle consisting of a large number of smaller monocrystalline diamond particles of any sizes which are bound together via $sp^3$ carbon-carbon bond or other types of bond.

The term "superabrasive", as used herein, may refer to an abrasive possessing superior hardness and abrasion resistance. Diamond, cubic boron nitride, diamond composite, and diamond like materials are examples of superabrasives and have Knoop indentation hardness values of over 3500.

The terms "diamond particle" or "particles" or "diamond powder", which is a plurality of a large number of single crystal or polycrystalline diamond particles, are used synonymously in the instant application and have the same meaning as "particle" defined above.

The term "table", as used herein, may refer to the sintered diamond layer, in which strong diamond to diamond bonds are present. The table may be a broad term, which may include diamonds are bonded by binder materials, such as silicon carbide, for example. In one embodiment, the table may be attached to the substrate. In another embodiment, the table may be a standalone table without any substrate. The table may include a "top" surface and a chamfer.

The term "free elements", used hereinafter, may refer to any forms of uncompounded or compounded elements. The term "free carbons", used hereinafter, may refer to any forms of uncompounded carbons, which may include diamond, graphite, graphene, fullerene, diamond like carbons (DLC). The term "magnetic saturation," used hereinafter, may refer to an condition when, after a magnetic field strength becomes sufficiently large, further increase in the magnetic field strength produces no additional magnetization in a magnetic material.

Polycrystalline diamond compacts (or "PDC", as used hereinafter) may represent a volume of crystalline diamond grains with embedded foreign material filling the inter-grain space. In one particular case, a polycrystalline diamond compact comprises crystalline diamond grains, bound to each other by strong diamond-to-diamond bonds and forming a rigid polycrystalline diamond body, and the inter-grain regions, disposed between the bound grains and filled in one part with a binder material (e.g. cobalt or its alloys), which was used to promote diamond bonding during fabrication, and in other part filled with other materials which may remain after the sintering of diamond compact. Suitable metal solvent binders may include the iron group transitional metal in Group VIII of the Periodic table.

"Thermally stable polycrystalline diamond," as used herein, is understood to refer to intercrystalline bound diamond that includes a volume or region that is or that has been rendered substantially free of the solvent metal binder used to form PDC, or the solvent metal binder used to form PDC remains in the region of the diamond body but is otherwise reacted or otherwise rendered ineffective in its ability adversely impact the bonded diamond at elevated temperatures as discussed above.

"Polycrystalline diamond composite compact," as used herein, may comprise a plurality of crystalline diamond grains, which are not bound to each other, but instead are bound together by foreign bonding materials such as borides, nitrides, carbides, and others, e.g. by silicon carbide bonded diamond material.

Embodiments according to the present disclosure are directed to superabrasive compacts having a polycrystalline diamond table and a substrate attached to the polycrystalline diamond table, where the substrate has a binder having a melting point that is from about 600° C. to about 1350° C. at a pressure from about 30 kbar to about 100 kbar. The binder may have free elements, compounds, or eutectic alloys that are introduced to the binder prior to HPHT processing. The free elements, compounds, or eutectic alloys may reduce the melting temperature of the binder.

During HPHT processing, the binder dissolves the free elements, compounds, or eutectic alloys. The free elements, compounds, or eutectic alloys may remain in solid solution in the binder and may not precipitate out of the binder during temperature quenching of the substrate and following removal of elevated temperature and pressure conditions of the HPHT process. Following HPHT processing, the binder may be supersaturated with free elements, compounds, or eutectic alloys that were dissolved in the binder during HPHT processing.

It may be desirable to introduce free elements, compounds, or eutectic alloys to a compact by adding them at a part of the substrate. It may be desirable to modify the part of the substrate proximal to the superhard material. Typically, the cylindrical surface of the principal portion of the substrate may be ground to its final desired dimension as the last step of the process.

In one embodiment, a mixture of tungsten carbide powder and cobalt powder is milled with extra free carbons or free elements, compounds, or eutectic alloys in excess of the stoichiometric proportion of tungsten carbide. The mixture may be pressed to form a "green" compact having the same general shape as the completed substrate. The "green" compact may have sufficient strength to maintain its shape during handling, but have less strength than when the green compact is sintered at an elevated temperature. This shape may be in the form of a cylinder. The conventional configurations may also include a chisel-like end, a hemispherical end, a rounded conical end, or other shapes.

In another embodiment, a mixture of tungsten carbide powder and cobalt powder and a chromium compound or chromium alloy is blended in a mill. Free carbon in excess of the stoichiometric proportion of tungsten carbide may be added to the mixture before blending. In one embodiment, the total amount of chromium by weight in the above mixture is greater than 10% of the total amount of cobalt by weight. After blending, the mixture may be pressed to form a "green" compact having the same shape as the completed substrate. This shape may be in the form of a cylinder. The conventional configurations may also include a chisel-like end, a hemispherical end, a rounded conical end or other shapes.

The green compacts may be loaded into a high temperature vacuum furnace and gradually heated to about the melting temperature of the binder (for example, cobalt), whereupon the compact is sintered to form a substrate of high density, that is, without substantial porosity. The substrates are then relatively slowly cooled in the vacuum furnace. On cooling, free carbon, compounds, or eutectic alloy precipitates out of the now-solidified binder inside the compact.

Without being bound by theory, it is believed that the introduction of the free elements, compounds, or eutectic alloys to the binder modify the lattice structure of the binder. The modification of the lattice structure may disrupt the strength of the bonds between atoms, which may reduce the energy required to separate the bonds between atoms. The introduction of the free elements, compounds, or eutectic alloys to the binder, therefore, may result in a decrease in melting temperature of the binder.

In another embodiment, the cemented tungsten carbide substrate may be carburized in a conventional manner. Pack, gas, or liquid carburizing may be used. Carburizing involves holding the substrate at elevated temperature in an environment with a high carbon pressure so that free carbon may be introduced through the surface of the substrate. Such free carbon may diffuse into the substrate through the binder phase (i.e., cobalt), which serves as a matrix for the hard metal particles (i.e., tungsten carbide). The carbon concentration in the chemically modified substrate, the depth that the free carbon penetrates into the chemically-modified substrate, and the profile of carbon concentration as a function of depth are functions of the time and temperature of the thermal treatment, carburizing, the composition of the carburizing environment, and the binder content of the substrate.

Carburizing sintered tungsten carbide may be generally accomplished by packing substrate in a bed of graphite powder and heating in a hydrogen or inert gas atmosphere or held under vacuum. The carburizing introduces excess free carbon into the substrate in an amount that is in excess of the stoichiometric proportion of hard metal content. Other techniques for carburizing are thoroughly described in Metals Handbook, 8th Ed., Vol. 2, *American Society for Metals*, 1964. To minimize carburization in one region of substrate, a conventional "stop off" may be painted on a surface of the substrate or a surface may be plated with a carbon-resistant material such as copper, as is conventional known in the carburizing art.

After the above chemical modifications are completed, including, for example, carburizing, the modified cemented substrate may be placed in the working volume of a high pressure device of the type used for synthesizing diamond crystals to undergo a high pressure high temperature (HPHT) sintering process. A tetrahedral press, cubic press, or belt press is suitable. A technique for pressing the substrate is described in U.S. Pat. No. 4,694,918.

Polycrystalline diamond compacts (or PDC compacts) may be fabricated in different ways and the examples discussed herein do not limit a variety of different types of diamond composites and PDC compacts which may be produced according to an embodiment. In one particular example, polycrystalline compacts may be formed by placing a mixture of diamond powder along a surface of a substrate (for example, placing diamond powder along a non-cylindrical surface of a cemented tungsten carbide substrate having a cobalt concentration). In some embodiments, the diamond powder may be pre-mixed with a suitable solvent binder material (e.g. cobalt powder). The assembly is then subjected to HPHT process, where the pre-mixed solvent binder promotes inter-crystalline diamond-to-diamond bonding between the diamond grains, resulting in the formation of a rigid polycrystalline diamond body. The solvent binder material also provides an attachment mechanism between the polycrystalline diamond body and the substrate.

In another particular example, a polycrystalline diamond compact is formed by placing diamond powder without a binder material along the surface of substrate containing a binder material (e.g. WC—Co substrate). In this example, cobalt binder material is supplied from the substrate and melted cobalt is swept through the diamond powder during the HPHT process.

In still another example, a hard polycrystalline diamond composite compact is fabricated by forming a mixture of diamond powder with silicon powder and the mixture is subjected to a HPHT process in which silicon is swept through the diamond grains, thus forming a dense polycrystalline compact where diamond particles are bonded together by silicon carbide material that is formed during the HPHT process.

In yet another example, a thermally stable polycrystalline diamond body is positioned along a surface of a substrate containing a binder material. The thermally stable polycrystalline diamond body and the substrate are subjected to a HPHT process in which binder material is melted in the substrate and swept from the substrate into the thermally stable polycrystalline diamond body. Upon allowing the components to cool, the binder material solidifies and attaches the thermally stable polycrystalline diamond body to the substrate.

The presence of binder materials inside the polycrystalline diamond body promotes the degradation of the cutting edge of the compact during the cutting process, especially if the edge temperature reaches elevated temperature. Without being bound by theory, it is believed that that the degradation may be caused by a large difference in coefficient of thermal expansion between diamond and the binder (e.g. cobalt metal). Operating at elevated temperatures increases the stress levels in the polycrystalline diamond body due to a mismatch in thermal expansion between the inter-bonded diamond grains and the binder, which may induce structural deficiencies into the inter-bonded diamond grains. Additionally, because the binder in the substrate is also a catalyst for diamond synthesis, binder that remains in the polycrystalline diamond body may also degrade performance of the polycrystalline diamond body due to a catalytic effect of the binder on diamond graphitization. Operating at elevated temperature and pressure conditions that are thermodynamically unstable for diamond while the diamond is in the presence of the catalytic binder may accelerate graphitization of diamond, which is undesirable for performance as a cutter.

Removal of binder from the polycrystalline diamond body of PDC compact, for example, by chemical leaching in acids, is conventionally known. Leaching of the polycrystalline diamond body leaves a region of the polycrystalline diamond body that is substantially free of binder material. Such a polycrystalline diamond body exhibits an interconnected network of interstitial volumes that space apart the diamond grains. The interconnected network of interstitial volumes may be free of binder material, while other interstitial volumes that are "trapped" by adjacent diamond grains and not connected to the interconnected network of interstitial volumes may continue to maintain the binder content. Such trapped interstitial volumes may account for up to about 10 vol. % of binder material that is trapped inside the polycrystalline diamond body. It has been demonstrated that depletion of cobalt from the polycrystalline diamond body of the PDC compact significantly improves a compact's service life with high abrasion resistance and high thermal stability. Thus, it is theorized that a thicker cobalt depleted layer near the cutting edge, such as more than about 100 µm may provide better service life of the PDC compact than a thinner cobalt depleted layer, such as less than about 100 µm.

Figure 1A:
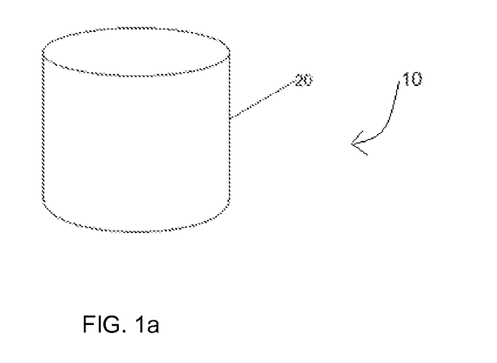
FIG. 1a is a schematic perspective view of a cylindrical shape compact without a superabrasive diamond table according to an embodiment.

In one embodiment, the compact 10 may be a substrate after high temperature processing. As shown in FIG. 1a, the compact 10 may include a plurality of carbide particles, such as tungsten carbide, a binder, and a species. The binder may be dispersed among the plurality of tungsten carbide particles. The species may be dispersed in the compact. The binder may have a melting point from about 600° C. to about 1350° C. at a high pressure from about 1 kbar to about 100 kbar, or 30 kbar to about 100 kbar, after chemical modifications, for example. The species may be selected from the group consisting of various elements, various compounds, and various eutectic alloys. The elements may include at least one of aluminum, carbon, magnesium, manganese, sulfide, or phosphorus, for example. The compounds may include at least one of various beryllium compounds, various boron compounds, various nitride compounds, various aluminum compounds, various silicon compounds, or various phosphorus compounds, for example. The eutectic alloy may include at least one of various beryllium alloys, various boron alloys, various carbide alloys, various aluminum alloys, various silicon alloys, various sulfur alloys, or various phosphorus alloys, for example.

Figure 1B:
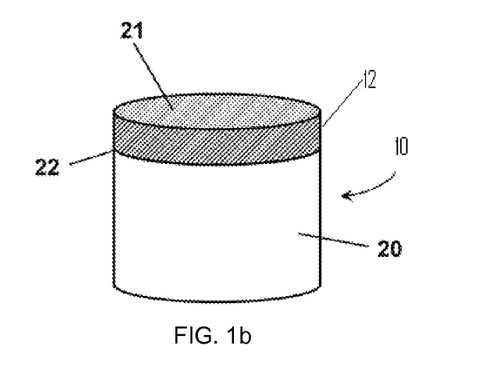
FIG. 1b is a schematic perspective view of a cylindrical shape superabrasive compact according to an embodiment.

In another embodiment, the superabrasive compact 10 may include the substrate 20 attached to the superabrasive body 12 along a non-cylindrical surface of the substrate 20. A superabrasive compact or more specifically, polycrystalline diamond compact 10 in accordance with one embodiment is shown in FIG. 1b. One example of the polycrystalline diamond compact 10 may include a superabrasive body 12 having a top surface 21. In further another embodiment, the superabrasive compact 10 may be a standalone compact without a substrate.

In one embodiment, the superabrasive body 12 may be formed by superabrasive particles, such as polycrystalline diamond particles. The superabrasive body 12 may be referred as a diamond body or diamond table when diamonds are used as superabrasive particles. The substrate 20 may be metal carbide, attached to the diamond body 12. The substrate 20 may be made from cemented tungsten carbide or nickel based tungsten carbide, while the diamond body 12 may be made from a polycrystalline diamond or diamond crystals bound together by diamond-to-diamond bonds or by a foreign material. The superabrasive cutter 10 may be inserted into a down hole as a suitable tool, such as a drill bit, for example.

The substrate 20 may contain at least one of tungsten carbide, chromium carbide, or cobalt. The substrate 20 may or may not contain at least one species from the group consisting of various elements, various compounds, and various eutectic alloys after high pressure high temperature. Initially, the substrate 20 contains at least one from the group consisting of various elements, various compounds, and various eutectic alloys, for example. The elements may include at least one of aluminum, carbon, magnesium, manganese, sulfide, or phosphorus, for example. The compounds may include at least one of various beryllium compound, various boron compound, various nitride compound, various aluminum compound, various silicon compound, or various phosphorus compound, for example. The various beryllium compound may include palladium-beryllium compound, for example. The various boron compounds may include cobalt boride ($Co_3B$), nickel boride ($Ni_3B$ or $Ni_2B$), palladium diboride ($PdB_2$), for example. The various nitride compounds may include calcium nitride ($Ca_3N_2$), strontium nitride ($Sr_3N_2$), barium nitride ($Ba_3N_2$), for example. Various aluminum compound may include calcium aluminide ($CaA_2$ or $CaAl_4$), barium aluminide ($BaAl_4$), yttrium aluminide (Y—Al), lanthanum aluminide (La—Al), cerium aluminide (Ce—Al), ytterbium aluminide (Yb—Al), titanium aluminide ($Ti_2Al$, $TiAl_3$), vanadium aluminide (V—Al), chromium aluminide (Cr—Al), molybdenum aluminide (Mo—Al), tungsten aluminide (W—Al), manganese aluminide (Mn—Al), iron aluminide (Fe—Al), cobalt aluminide (Co—Al), nickel aluminide (Ni—Al), palladium-aluminide (Pd—Al). Various silicon compounds may include magnesium silicon ($Mg_2Si$), calcium silicon (Ca—Si), strontium silicon (Sr—Si), barium silicon (Ba—Si), manganese silicon (Mn—Si), nickel silicon (Ni—Si), for example. Various phosphorus compounds may include manganese phosphorus (Mn—P), nickel phosphorus (Ni—P), for example. Various sulfide compound may include barium sulfide (Ba—S), iron sulfide (FeS), Cobalt sulfide (Co—S), and nickel sulfide (Ni—S), for example. The various eutectic alloys comprise at least one of beryllium alloy, boron alloy, carbide alloy, aluminum alloy, silicon alloy, sulfur alloy or phosphorus alloy. Beryllium alloy may include beryllium yttrium alloy (Be—Y), beryllium thorium (Be—Th), beryllium titanium (Be—Ti), beryllium titanium (Be—Ti), beryllium zirconium (Be—Zr), beryllium hafnium (Be—Hf), beryllium iron (Be—Fe), beryllium cobalt (Be—Co), beryllium nickel (Be—Ni), beryllium palladium (Be—Pd), beryllium boron (Be—B), boron cobalt (B—Co), boron nickel (B—Ni), boron palladium (B—Pd), for example. Boron alloy may include boron cobalt (B-co), boron nickel (B—Ni), boron palladium (B—Pd), for example. Carbide or carbon alloy may include lanthanum carbide (C—La), iron carbide (Fe—C), for example. Aluminum alloy may include calcium aluminum alloy (Al—Ca), barium aluminum (Ba—Al), yttrium aluminum (Y-Al), lanthanum aluminum (La—Al), cerium aluminum (Ce—Al), neodymium aluminum (Nd—Al), hafnium aluminum (Hf—Al), iron aluminum (Fe—Al), nickel aluminum (Ni—Al), palladium aluminum (Pd—Al), for example. Silicon alloy may include strontium silicon (Sr—Si), barium silicon (Ba—Si), cerium silicon (Ce—Si), manganese silicon (Mn—Si), rhenium silicon (Re—Si), cobalt silicon (Co—Si), iron silicon (Fe—Si), nickel silicon (Ni—Si), palladium silicon (Pd—Si), for example. Phosphorus alloy may include manganese phosphorus (Mn—P), iron phosphorus (Fe—P), nickel phosphorus (Ni—P), for example. Sulfur alloy may include iron sulfur (Fe—S), cobalt sulfur (Co—S), and nickel sulfur (Ni—S), for example.

More specifically, a superabrasive compact may include a polycrystalline diamond table and a substrate attached to the polycrystalline diamond table. The substrate, such as cemented tungsten carbide or nickel based tungsten carbide, for example, may have a binder and free carbons. The melting point of the binder may be from about 600° C. to about 1350° C. at from about 1 kbar to about 100 kbar, for example, from about 30 kbar to about 100 kbar, after chemical modifications. The substrate may further contain at least one of tungsten carbide, chromium carbide, or cobalt. The free carbons may be evenly distributed inside the tungsten carbide before the high pressure high temperature sintering process. After the high pressure high temperature sintering process, the interface between the diamond table and tungsten carbide may not exhibit a binder enrichment.

One embodiment of disclosure shows that free carbon may not be detected by a conventional measuring technique (such as optical microscopy) after high pressure and temperature sintering. Instead, the free carbon may be transformed to another phase in the bulk of the substrate or dissolved into the binder, such as cobalt. Therefore, detection of the additional carbon may be evaluated using chemical analysis, for example, energy dispersive spectrometry or x-ray fluorescence. The detected carbon levels may exceed carbon levels in substrates that incorporate saturated levels of carbon in the binder and that are processed according to conventional sintering techniques. Conversely, in conventional tungsten carbide applications, substrates with free elements, such as carbon precipitates, that exceed the saturation limit of the free element in the binder may be undesired because the free element precipitates out of the binder. Therefore, the introduction of free elements, for example free carbon, to a metal carbide substrate to levels that exceed the saturation limit of the binder reduces the fracture toughness and strength of the carbide substrate.

Conventionally sintered metal carbide substrates that have carbon content that exceeds the saturation limit of the binder exhibit precipitation of carbon out of the binder as the metal carbide substrate cools from sintering temperature. This precipitation of carbon may be identified through optical microscopy through the indication of carbon agglomerates that have formed within in the binder. The precipitation of carbon out of the binder may also form porosity in the metal carbide substrate. This porosity may lead to a decrease in strength, toughness, and abrasion resistance of the metal carbide substrate, and may therefore be undesired for demanding end user applications. In contrast, substrates manufactured according to the present disclosure may exhibit no or substantially no porosity following HPHT processing while the free element, compound, or eutectic alloy exceeds the saturation limit of the binder. In general, residual porosity of a cemented tungsten carbide substrate may be measured according to ASTM B-276. Substrates processed according to the present disclosure may satisfy the "A" type porosity in which pores are less than 10 microns in diameter. Because the additional free element, compound, or eutectic alloy does not precipitate out of the binder following HPHT processing and instead is held in solid solution in the binder, porosity of the metal carbide substrates of the present disclosure is minimized.

The substrate 20 according to the present disclosure may have a magnetic saturation ranging between about 80% and about 85% and coercivity from about 13.05 kA/m to about 14.01 kA/m. In another embodiment, the magnetic saturation may range from about 81% to about 84%. Coercivity, also called the coercive field or coercive force, is a measure of a ferromagnetic or ferroelectric material to withstand an external magnetic or electric field. In one embodiment, the density of the substrate is at least about 14.13 g/cm$^3$ after high pressure and high temperature. In another embodiment, the density of the substrate is at least about 14.20 g/cm$^3$ after high pressure and high temperature.

In another embodiment, elements, compound, or eutectic alloys may be transformed to another phase in the bulk of the substrate after the substrate is subjected to high pressure high temperature, thus potentially maintaining or improving the toughness of the substrate.

For ferromagnetic material, the coercivity is the intensity of the applied magnetic field required to reduce the magnetization of that material to zero after the magnetization of the sample has been driven to saturation. Thus, coercivity measures the resistance of a ferromagnetic material to becoming demagnetized. Coercivity is usually measured in oersted or ampere/meter units and is denoted Hc.

The substrate 20 may have a compound with a composition of $A_xB_yC_z$, wherein A and B are selected from a group consisting of a transition metal, wherein $0 \leq x \leq 7$, $0 \leq y \leq 7$, $x+y=7$, and $0 \leq z \leq 3$, and wherein C is carbon. In various embodiments, $1 \leq z \leq 3$, or $2 \leq z \leq 3$, or $z=3$. The polycrystalline diamond table may have the composition of $A_xB_yC_z$, wherein A and B are selected from a group consisting of a transition metal, wherein $0 < x \leq 7$, $0 < y \leq 7$, $x+y=7$, and $0 \leq z \leq 3$. In various embodiments, $1 \leq z \leq 3$, or $2 \leq z \leq 3$, or $z=3$. The transition metal is at least one of VIB, VIIIB, IXB, and XB group metal. The transition metal may be at least one of W, Co, Cr. In one embodiment, the compound may be $Cr_7C_3$. In another embodiment, the compound may be $Co_7C_3$.

The superabrasive compact 10 may be referred to as a polycrystalline diamond compact or cutter when polycrystalline diamond is used to form the diamond body 12. The superabrasive compacts are known for their toughness and durability, which allow the superabrasive compacts to be an effective cutter in demanding applications. Although one type of superabrasive compact 10 has been described, other types of superabrasive compacts may be utilized. In general, one type of superabrasive compact 10 may have a generally cylindrical shape, with a diamond table that extends along a longitudinal axis of rotation and away from an interface between the substrate and the diamond table. The superabrasive compact 10 may be selected from a variety of industry-standard sizes, including having a nominal diameter of 19 mm, 16 mm, 13 mm, 11 mm, or 8 mm. In one embodiment, superabrasive compact 10 may have a chamfer (not shown) around an outer peripheral of the top surface 21. The chamfer may have a vertical height of about 0.5 mm or 1 mm and an angle of about 45° degrees, for example, which may provide a particularly strong and fracture resistant tool component. The superabrasive compact 10 may be a subject of procedure depleting binder metal (e.g. cobalt) near the cutting surface of the compact, for example, by chemical leaching of cobalt in acidic solutions. The unleached superabrasive compact may be fabricated according to processes known to persons having ordinary skill in the art. Methods for making diamond compacts and composite compacts are more fully described in U.S. Pat. Nos. 3,141, 746; 3,745,623; 3,609,818; 3,850,591; 4,394,170; 4,403, 015; 4,794,326; and 4,954,139, the disclosures of which are hereby incorporated by reference.

Figure 2:
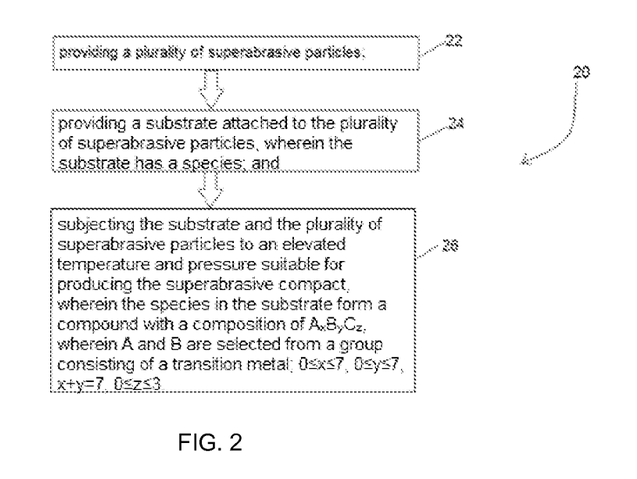
FIG. 2 is a flow chart illustrating a method of making superabrasive compact according to one embodiment.

As shown in FIG. 2, a method 20 of making a superabrasive compact may comprise steps of providing a plurality of superabrasive particles, which are selected from a group consisting of cubic boron nitride, diamond, and diamond composite materials, in a step 22; providing a substrate, such as cemented tungsten carbide or nickel based tungsten carbide, that is positioned proximate to the plurality of superabrasive particles, wherein the substrate has a species, in a step 24; and subjecting the substrate and the plurality of superabrasive particles to an elevated temperature and pressure, such as more than about 1200° C. and more than about 55 kbar respectively, suitable for producing the superabrasive compact, wherein the species in the substrate forms a compound with a composition of $A_xB_yC_z$, wherein A and B are selected from a group consisting of a transition metal and wherein $0 \leq x \leq 7$, $0 \leq y \leq 7$, $x+y=7$, and $0 \leq z \leq 3$, in a step 26. In one embodiment, the plurality of superabrasive particles may be superabrasive powders or feeds, such as diamond, with various sizes and geometries. In another embodiment, the plurality of superabrasive particles may be a partially leached polycrystalline diamond table. In further embodiment, the plurality of superabrasive particles may be a fully leached polycrystalline diamond table.

The method 20 may further include steps of dissolving the species into a binder in the substrate at the elevated temperature and pressure, wherein the dissolved species do not precipitate out after cooling down to room temperature and ambient pressure from the elevated temperature and pressure, and instead remain in solid solution with the binder; attaching the substrate to at least partially leached polycrystalline diamond table; sweeping the plurality of superabrasive particles with a binder from the substrate, wherein the binder may be cobalt. In one embodiment, the transition metal may be at least one of VIB, VIIIB, IXB, and XB group metal. The transition metal may be at least one of W, Co, Cr. In one embodiment, the compound may be $Cr_7C_3$. In another embodiment, the compound may be $Co_7C_3$.

The substrate and superabrasive particles, with a protective metal can, may be surrounded by pyrophyllite or salt-based reaction cell. The reaction cell distributes applied pressures to the inserted components so that the inserted components are subjected to approximately isostatic pressure. Sufficient pressure may then be applied such that diamond, in combination with the binder, is thermodynamically stable at the temperatures involved in the HPHT process. In one embodiment, diamond powder is positioned within a tantalum (Ta) cup and covered with a cemented tungsten carbide disk, such that the cemented tungsten carbide disk is positioned proximate to the diamond powder. Several of these cups may be loaded into a high temperature/ high pressure reaction cell and subjected to pressures of at least about 1 kbar, for example at least about 30 kbar, at temperatures between about 600° C. and about 1500° C., or between about 600° C. and 1500° C., for up to about 30 minutes to form the sintered PCD compact. In an embodiment, a pressure of about 60 kbar may be applied to the reaction cell. A minimum pressure of about 1 kbar to 45 kbars may be selected for application to the reaction cell. As the assembly containing the substrate reaches high pressure, current may be introduced to a heater that surrounds the reaction cell to raise the temperature of the reaction cell components to greater than about 600° C. Such pressure and temperature may be held from about 10 seconds to about 180 seconds so that the free carbon may dissolve in the binder or be converted to another phase.

The substrate may then be finished for use by grinding the cylindrical body or other shapes.

In one embodiment, the species may include various elements, various compounds, or various eutectic alloys. The various elements are selected from the group consisting of carbon, boron, beryllium, aluminum, manganese, sulfur, and phosphorus, for example. The compounds include at least one of various beryllium compounds, various boron compounds, various nitride compounds, various aluminum compounds, various silicon compounds, or various phosphorus compounds, for example. The various eutectic alloys may include at least one of various beryllium alloys, various boron alloys, various carbide alloys, various aluminum alloys, various silicon alloys, various sulfur alloys or various phosphorus alloys, for example. Because elements, compounds, or alloys, have dissolved into the solid solution in binder matrix of tungsten carbide, the melting point of the binder, such as cobalt containing component may be decreased from about 1440° C. to about 600° C. In one embodiment, the melting point of the binder may be decreased from 1440° C. to about 900° C. In further another embodiment, the melting point of the binder may be decreased from 1440° C. to about 1200° C. Before subjecting the substrate and the plurality of superabrasive particles to the elevated temperature and pressure, the substrate has a magnetic saturation ranging between about 95% and about 100%. After cooling down to room temperature and ambient pressure from the elevated temperature and pressure, wherein the substrate has a magnetic saturation ranging between about 80% and about 85%.

One or more steps may be inserted in between or substituted for each of the foregoing steps 22-26 without departing from the scope of this disclosure.

Figure 3:
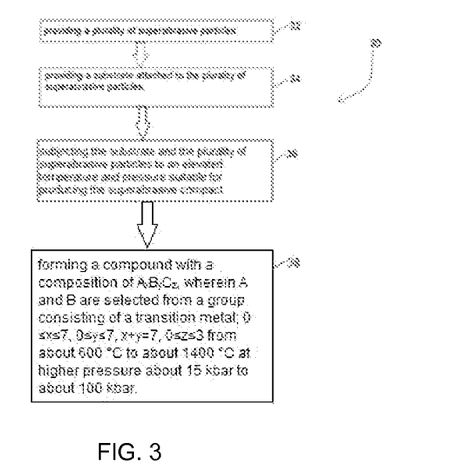
FIG. 3 is a flow chart illustrating a method of making superabrasive compact according to another embodiment.

In another embodiment, a method 30 of making a superabrasive compact may comprise steps of providing a plurality of superabrasive particles, being selected from a group consisting of cubic boron nitride, diamond, and diamond composite materials, in a step 32; providing a substrate at a position proximate to the plurality of superabrasive particles, wherein the substrate has a species, wherein the substrate is a cemented tungsten carbide or nickel based tungsten carbide, in a step 34; and subjecting the substrate and the plurality of superabrasive particles to elevated temperature and pressure suitable, such as more than about 600° C. and about 30 kbar respectively, for producing the superabrasive compact in a step 36; forming a compound with a composition of $A_xB_yC_z$, wherein A and B are selected from the group consisting of a transition metal, and $0 \leq x \leq 7$, $0 \leq y \leq 7$, $x+y=7$, and $0 \leq z \leq 3$ at from about 600° C. to about 1350° C., in a step 38. In various embodiments, $1 \leq z \leq 3$, or $2 \leq z \leq 3$, or $z=3$.

The method 30 may further include steps of sweeping the plurality of superabrasive particles with a binder from the substrate, wherein the binder from the substrate may be cobalt or nickel; bonding the substrate to the at least partially leached polycrystalline diamond table. In one embodiment, the plurality of superabrasive particles may be superabrasive powders or feeds, such as diamonds, with various sizes and geometries. In another embodiment, the plurality of superabrasive particles may be a partially leached polycrystalline diamond table. In further embodiment, the plurality of superabrasive particles may be a fully leached thermally stable polycrystalline diamond table.

In one embodiment, the species may include elements, compounds, or alloys. The elements are selected from the group consisting of carbon, boron, beryllium, aluminum, manganese, sulfur, and phosphorus, for example. The compounds include at least one of beryllium compound, boron compound, nitride compound, aluminum compound, silicon compound, or phosphorus compound, for example. The eutectic alloy may include at least one of beryllium alloy, boron alloy, carbide alloy, aluminum alloy, silicon alloy, sulfur alloy or phosphorus alloy, for example. The elements may include free carbons.

Figure 4:
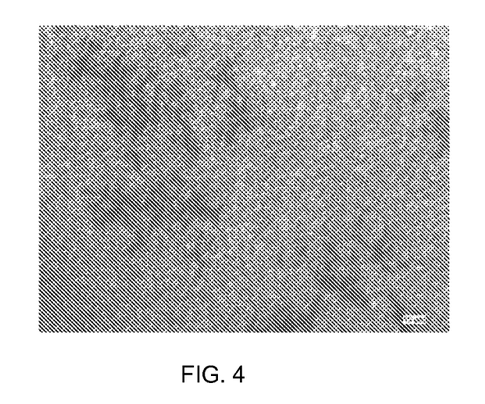
FIG. 4 is a scanning electron microscopy (SEM) micrograph of a substrate before being exposed to an elevated temperature and pressure and illustrating an existence of free carbon.
Figure 5:
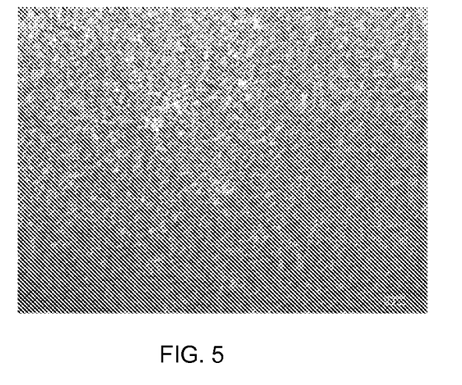
FIG. 5 is a scanning electron microscopy (SEM) micrograph of a substrate after being exposed to an elevated temperature and pressure illustrating disappearance of free carbon.

Graphite inclusions, which commonly occur in cemented tungsten carbide specimens having carbon concentration in excess of the solubility limit, are no longer present in substrates processed according to the present disclosure. FIG. 4 depicts a cobalt-cemented tungsten carbide substrate that has carbon above the solubility limit of the cobalt. The dark black regions of the photomicrograph are free carbon that is not in solid solution with the binder. A substrate processed in an HPHT process according to the present disclosure is depicted in FIG. 5, as shown in FIG. 5. As can be seen, the dark black region has been eliminated from the microstructure of the substrate. It appears that there is complete disappearance of excess carbon, and free carbon and may not be detected by a conventional optical microscopy technique. Instead, excess carbon is dissolved in solid solution in the cobalt binder. The excess carbon does not precipitate out of the cobalt after cooling down from the elevated pressure and temperature conditions of the HPHT process.

One or more steps may be inserted in between or substituted for each of the foregoing steps 32-38 without departing from the scope of this disclosure.

EXAMPLES

Superabrasive compacts were produced by the methods described in the prior art. The superabrasive compacts were composed of a starting diamond powder having grains exhibiting about 15-25 microns in diameter. The method of fabrication was similar to a conventional PDC fabrication process. The diamond powder was added into a cup of refractory metal and encased in the cup with a cemented tungsten carbide substrate, which was positioned to abut the diamond powder. The cup was then surrounded by a gasket material and subjected to HPHT conditions (here, about 70 to about 75 kbar, about 1500 to about 1600° C.) in a hydraulic press. The compacts were further finished to remove tungsten carbide substrate and were then acid leached to substantially remove the binder (cobalt catalyst) from accessible interstitial volumes within the diamond table. The final thickness of the diamond table after leaching and further finishing was about 2.1 mm to about 2.2 mm.

Example 1

A cemented tungsten carbide substrate was formed with cobalt and free carbon in the binder phase. A green cemented tungsten carbide substrate was formed. Graphite powder (carbon) was disposed on the top, non-cylindrical surface of the cemented tungsten carbide substrate and heated at 1410° C. for about 75 minutes at 50 bar in an Argon atmosphere. Free carbon precipitation was detected within the substrate by a conventional detection technique (optical microscope imaging). The cemented tungsten carbide was further finished to the required size after the sintering process. The final composition of the substrate contained about 5.57 wt % of total carbon. A substantially leached porous diamond table having a thickness of about 2.1 mm and a nominal diameter of 16 mm was prepared according to the method above was assembled on the top, non-cylindrical surface of the sintered cemented tungsten carbide substrate with free carbon. The assembly was positioned within a refractory metal container. The refractory metal container was loaded into the cell designed for pressing in a belt press, although a cubic press may alternatively been used. The cell was loaded inside the dies of the belt press and was subjected to a high pressure high temperature (HPHT) cycle, in which pressure was maintained at about 60 kbar to about 70 kbar at a temperature of about 1250° C. to about 1300° C. for about 5 minutes to about 8 minutes. After the high pressure high temperature cycle was completed and the pressure and temperature applied to the cell was withdrawn, the cup was removed from the belt press for further finishing. Test results of this superabrasive compact are marked as Example 1. The final cemented tungsten carbide substrate of the polycrystalline diamond cutter contained about 1.2 wt % Cr, 12.5 wt % Cobalt, and 86.3 wt % tungsten carbide.

Example 2

Another diamond compact made with a conventional cemented tungsten carbide substrate without free carbon was manufactured according to example 1. HPHT cycle parameters included maintaining pressure at about 60 kbar to 70 kbar at a temperature of about 1350° C. to about 1400° C. for about 5 minutes to about 8 minutes. The final substrate for the polycrystalline diamond cutter contained about 0.75 wt % Cr, 11.5 wt % Cobalt, and 87.75 wt % tungsten carbide. Test results of this superabrasive compact, made with cemented tungsten carbide substrate with no free carbon, are marked as Example 2 in FIG. 6.

The two cutting elements A and B were subjected to an abrasion test, representing a standard vertical turret lather test using flushing water as a coolant (VTL-c). Such rock materials typically exhibit a compressive strength of about 200 MPa. The linear velocity at the cutting edge was the 400 surface feet per minute (sfm).

Figure 6:
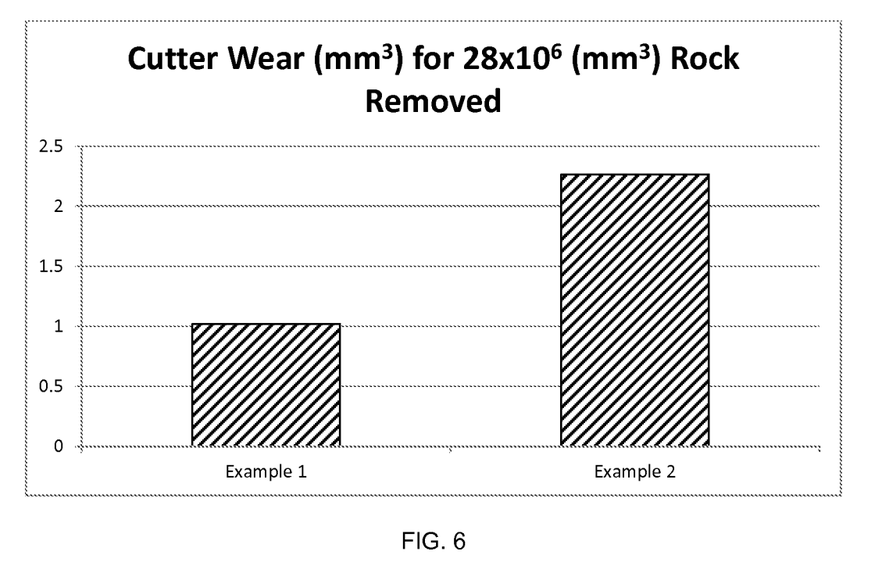
FIG. 6 is a bar chart showing a relative improvement in wear resistance against a granite rock of a superabrasive compact made from a substrate made of sintered tungsten carbide with free carbon (Example 1) over a substrate made of sintered tungsten carbide without free carbon (Example 2).

VTL-c abrasion testing results, plotted as dependence of wear volume of compact versus removed volume of rock, are shown in FIG. 6. From FIG. 6, the cutter of Example 2 had 2.22 times the wear of the cutter A for the same amount of rock removed. In other words, the cutter of Example 1 exhibited a higher wear resistance than the cutter of Example 2.

While reference has been made to specific embodiments, it is apparent that other embodiments and variations can be devised by others skilled in the art without departing from their spirit and scope. The appended claims are intended to be construed to include all such embodiments and equivalent variations.

The invention claimed is:

1. A method of making a superabrasive compact, comprising:
positioning a plurality of superabrasive particles proximate to a substrate, wherein the substrate comprises hard metal carbides, a binder, and a species; and
subjecting the substrate and the plurality of superabrasive particles to a high pressure high temperature process suitable for producing the superabrasive compact,
wherein the species is selected from (i) the group of elements consisting of boron, aluminum, and manganese, (ii) the group of compounds consisting of a boron compound, an aluminum compound, and a manganese compound, and (iii) the group of eutectic alloys consisting of a boron alloy, an aluminum alloy, and a manganese alloy, and
wherein in the high pressure high temperature process, the species in the substrate form a compound with a composition of $A_xB_yC_z$, wherein A is a metal from the species, B is selected from the group consisting of W, Co, and Cr, and C is carbon, and wherein $0<x\leq7$, $0<y\leq7$, $x+y=7$, and $0\leq z\leq3$.

2. The method of claim 1, wherein the substrate comprises cemented tungsten carbide or nickel based tungsten carbide.

3. The method of claim 1, wherein the superabrasive particles are selected from a group of cubic boron nitride, diamond, diamond composite materials, and diamond-like materials.

4. The method of claim 1, further comprising dissolving the species into the binder in the substrate at the elevated temperature and pressure.

5. The method of claim 4, wherein the dissolved species does not precipitate out of the binder after cooling down to room temperature and ambient pressure from the elevated temperature and pressure.

6. The method of claim 1, wherein the high pressure high temperature process subjects the superabrasive particles and the substrate to an elevated temperature and pressure are more than about 600° C. and more than about 30 kbar, respectively.

7. The method of claim 1, wherein the plurality of superabrasive particles are an at least partially leached polycrystalline diamond table.

8. The method of claim 7, further comprising attaching the substrate to the at least partially leached polycrystalline diamond table.

9. The method of claim 1, further comprising sweeping the binder from the substrate into the plurality of superabrasive particles.

10. The method of claim 9, wherein the binder in the substrate comprises cobalt.

11. The method of claim 1, wherein, after the high pressure high temperature process, the binder comprises a supersaturated solid solution of the at least one species in the binder.

12. The method of claim 1, wherein, after the high pressure high temperature process, the binder contains a concentration of the at least one species that exceeds a saturation limit of the at least one species in the binder.

13. The method of claim 12, wherein the substrate exhibits pore sizes of less than 10 microns in diameter.

14. The method of claim 1, wherein the high pressure high temperature process subjects the superabrasive particles and the substrate to an elevated temperature of about 600° C. to about 1350° C. at an elevated pressure of about 30 kbar to about 100 kbar.

15. The method of claim 1, wherein the species is selected from the group consisting of boron, a boron compound, and a boron alloy.

16. The method of claim 1, wherein the species is selected from the group consisting of aluminum, an aluminum compound, and an aluminum alloy.

* * * * *